United States Patent [19]
Purvis et al.

[11] Patent Number: 5,823,219
[45] Date of Patent: Oct. 20, 1998

[54] SYSTEM AND METHOD FOR PRODUCING AND MAINTAINING PREDETERMINED PROPORTIONATE MIXTURES OF FLUIDS

[75] Inventors: Fay A. Purvis, Malvern; William R. MacBride, Glenmoore; Edward C. Norman, Chester Springs, all of Pa.

[73] Assignee: National Foam, Inc., Lionville, Pa.

[21] Appl. No.: 520,050

[22] Filed: Aug. 28, 1995

Related U.S. Application Data

[63] Continuation-in-part of Ser. No. 309,759, Sep. 21, 1994, abandoned, which is a continuation of Ser. No. 137,707, Oct. 14, 1993, abandoned, which is a division of Ser. No. 931,933, Aug. 18, 1992, Pat. No. 5,284,174.

[51] Int. Cl.$^6$ .................................................. F16K 31/00
[52] U.S. Cl. .................................................. 137/5; 137/93
[58] Field of Search ........................................... 137/5, 93

[56] References Cited

U.S. PATENT DOCUMENTS

| | | |
|---|---|---|
| 3,013,572 | 12/1961 | Lahti et al. . |
| 3,014,178 | 12/1961 | Dunn . |
| 3,275,018 | 9/1966 | Roberts . |
| 3,592,269 | 7/1971 | Stults . |

(List continued on next page.)

FOREIGN PATENT DOCUMENTS

| | | |
|---|---|---|
| 0263290 | 4/1988 | European Pat. Off. . |
| 3123279 | 12/1982 | Germany . |
| 3817852 | 7/1989 | Germany . |
| 1526741 | 9/1978 | United Kingdom . |

OTHER PUBLICATIONS

Operating instructions for the Feecon Corp. "Feecon Around-the-Pump-Proportioner Model A.P.," dated Jan. 24, 1986.

National Foam publication entitled "Foam Concentrate Proportioning,"pp. 3–3 through 3–8, earliest page dated Aug. 1985.

Fireout Systems, Ltd. promotional brochure on "The Flow Based Proportioning System," dated 1985.

Fire Research Corp. promotional brochure for "Electronic Foam Systems Model: EF50," undated.

Hypro Coroporation promotional brochure for "FormFlo System 1000," undated.

Hypro Corporation promotional brochure for "FormPro System 2000," undated.

Hypro Corporation promotional brochure for "FormPro System 2000EZ," undated.

Hypro Corporation promotional brochure for "FoamPro System 3000," undated.

Hypro Corporation "The FoamProportioner" newsletter, vol. 91, Issue 1, Mar. 1991.

*Primary Examiner*—John Fox
*Attorney, Agent, or Firm*—Samuels, Gauthier, Stevens & Reppert

[57] ABSTRACT

A system and method for continuously producing and maintaining a predetermined proportionate mixture of two fluids, such as water and foam concentrate, in accordance with conductivity measurements of the fluids and the mixture. A set point is established which is representative of the conductivity of the predetermined proportionate mixture, by way of continuously measuring the conductivity of each fluid and feeding data to a microprocessor which calculates the conductivity of the desired proportionate mixture. The conductivity of the mixture is measured and compared with the set point by conductivity probes and a microprocessor. A control valve is continuously adjusted to maintain the predetermined proportionate mixture in response to control signals from the microprocessor in accordance with the comparisons of the conductivity values.

7 Claims, 3 Drawing Sheets

U.S. PATENT DOCUMENTS

| | | |
|---|---|---|
| 3,709,302 | 1/1973 | Stults . |
| 3,739,795 | 6/1973 | Hyde et al. . |
| 3,750,754 | 8/1973 | Stults . |
| 3,900,043 | 8/1975 | Bowen et al. . |
| 3,918,469 | 11/1975 | Zamboni et al. . |
| 3,977,474 | 8/1976 | Boegli . |
| 4,031,912 | 6/1977 | Lu et al. . |
| 4,064,891 | 12/1977 | Eberhardt . |
| 4,246,969 | 1/1981 | McLoughlin et al. . |
| 4,278,132 | 7/1981 | Hostetter . |
| 4,324,294 | 4/1982 | McLoughlin et al. . |
| 4,417,601 | 11/1983 | Bennett . |
| 4,439,329 | 3/1984 | Kleiner et al. . |
| 4,460,480 | 7/1984 | Kleiner et al. . |
| 4,474,680 | 10/1984 | Kroll . |
| 4,526,234 | 7/1985 | Little . |
| 4,531,588 | 7/1985 | Brünsicke . |
| 4,633,895 | 1/1987 | Eberhardt . |
| 4,648,043 | 3/1987 | O'Leary . |
| 4,776,977 | 10/1988 | Taylor . |
| 4,805,700 | 2/1989 | Hoover . |
| 4,828,038 | 5/1989 | Williams . |
| 4,899,825 | 2/1990 | Bosoni et al. . |
| 5,009,244 | 4/1991 | Grindley et al. . |
| 5,174,383 | 12/1992 | Haugen et al. . |
| 5,284,174 | 2/1994 | Norman . |

SYSTEM AND METHOD FOR PRODUCING AND MAINTAINING PREDETERMINED PROPORTIONATE MIXTURES OF FLUIDS

This is a continuation-in-part of application Ser. No. 08/309,759 filed on Sep. 21, 1994, now abandoned, which is a continuation of Ser. No. 08/137,707 filed on Oct. 14, 1993, now abandoned, which is a divisional of Ser. No. 07/931,933 filed on Aug. 18, 1992, now U.S. Pat. No. 5,284,174.

BACKGROUND OF THE INVENTION

The invention relates to the production and maintenance of predetermined proportionate mixtures of fluids, and more specifically to a system and method for producing and maintaining a proportionately constant mixture of water and foam concentrate, typically for use in firefighting apparatus.

Direct injection foam concentrate proportioning systems offer many advantages over the currently used balanced pressure, in-line eductor and around-the-pump systems. Balanced pressure systems require ratio controllers which have limits as to flow range, and which also typically produce an undesirable pressure loss. In-line eductor systems are limited as to flow range and back pressure tolerance, and typically cause a pressure loss of 30–40% of inlet pressure. Due to the fact that eductors will not function if back pressure exceeds 65–70% of inlet pressure, these systems must be carefully matched to the downstream system so that excessive back pressure will not occur. Their proportioning accuracy is poor if the inlet pressure varies significantly from the design value. Around-the-pump systems require readjustments of the proportioning valve each time the system flow changes, and will not work if pump inlet pressure exceeds the allowable back pressure of the high volume jet pump used in the system. The around-the-pump proportioners cannot be used in systems where foam solution is desired at some system discharge points and water at others. However, they have considerable utility, especially in aircraft crash rescue vehicles and municipal pumpers.

Conventional direct injection systems make use of paddlewheel-type flow meters to measure water and foam concentrate flow rates. The foam concentrate flow rate is then adjusted either manually or automatically to the desired percentage of the water flow rate. Paddlewheel flow meters are affected by the viscosity of the liquid being measured, thus making it necessary to recalibrate them for foam concentrates of differing viscosities, and making them impossible to use with foam concentrates which have non-Newtonian rheologies. Exemplary systems of this type are described in U.S. Pat. Nos. 4,324,294 and 4,246,969, both issued to McLoughlin et al., relating to chemical injection systems.

Foam systems are usually placed in operation only in case of emergencies, i.e. fires. If the fire is large, the supply of foam concentrate on hand may become exhausted. To guard against this possibility, owners of facilities where large fire hazards exist normally make mutual aid arrangements with local fire departments and the owners of other similar facilities nearby. These arrangements provide for the sharing of foam concentrate stocks, equipment, manpower, etc. The foam concentrates stocked by mutual aid partners may not be of the same brand or type as that stocked at any individual facility. Therefore, it is vital that foam concentrate proportioning systems be capable of operating accurately with a range of foam concentrates which may differ as to viscosity and conductivity.

Similarly, in the case of a large emergency, the facility water system may not have sufficient capacity to provide sufficient flow to extinguish the fire. In this case, water may be supplied from alternate sources by means of fire pumper relays and the like. This water may not have the same conductivity characteristics as the water available form the facility water system. Therefore a proportioning system which operates on the basis of conductivity must have the capability to operate accurately with both foam concentrates and water of varying conductivities and must have the capability to rapidly compensate for such variations.

U.S. Pat. No. 5,284,174 issued to Norman describes a method of producing and maintaining predetermined proportionate mixtures of liquids of varying conductivities in accordance with conductivity measurements by use of a system which produces mechanically, on a small scale, an accurate proportionate mixture of two fluids. The conductivity of this mixture is measured and used as a set point which is compared to the conductivity of the process mixture by means of a microprocessor. The microprocessor generates control signals to adjust a control valve in order to match the conductivity of the process mixture to that of the accurately prepared sample. It has now been found that this system can be simplified and improved by eliminating the device which prepares the accurate proportionate sample, instead measuring the conductivities of each of the fluids and using these values to calculate the set point.

SUMMARY OF THE INVENTION

It is an object of the present invention to provide a proportioning system which is not dependent on flow rate or pressure measurements for producing proportionately constant mixtures of fluids.

It is a further object of the present invention to provide a system which produces a proportionately constant mixture of first and second fluids in accordance with the electro-chemical properties of the fluids being mixed.

It is another object of the present invention to provide a direct injection proportioning system which performs automatic injection of foam concentrates into a water stream to produce a preselected solution percentage based on the conductivity properties of the water and foam concentrates.

In accordance with these and other objects, the present invention provides a system and method for producing a proportionally constant mixture of first and second fluids. The system includes a first supply of the first fluid and a second supply of the second fluid. A predetermined mixture ratio of the first and second fluids is initially selected. A set point conductivity of the selected mixture ratio is determined by continually measuring conductivity levels of the first and second fluids prior to mixing them. These ongoing conductivity values are electronically sent to a microprocessor which computes the set point conductivity value of the selected mixture ratio. The first and second fluids are then mixed in accordance with their measured conductivity characteristics as compared to the set point so as to produce the desired proportionately constant mixture. The proportionally constant mixtures of the first and second fluids is then discharged.

Conductivity proportioning is not dependent on flow rate or pressure as is inherent with conventional ratio controllers. Conductivity will solve the problem of accurate proportioning over a wide range of flows. Currently available equipment operates with a turn-down range of approximately 8:1. Thus, the maximum flow of the device is about eight times greater than the minimum flow. For example, an exemplary flow range through a four-inch ratio controller is typically 150 GPM to 1200 GPM. Many systems need to operate over a wider range, such as 50 GPM to 2500 GPM or higher. The prior art necessitates a compromise in proportioning accuracy or use of multiple ratio controller sizes with flow ranges to set system flow range requirements. Some systems will proportion less-than-desired percentages (lean) at low flows (less than standard flow range), while others will operate at greater than the desired percentage (rich).

DETAILED DESCRIPTION OF THE ILLUSTRATED EMBODIMENTS

Figure 1:
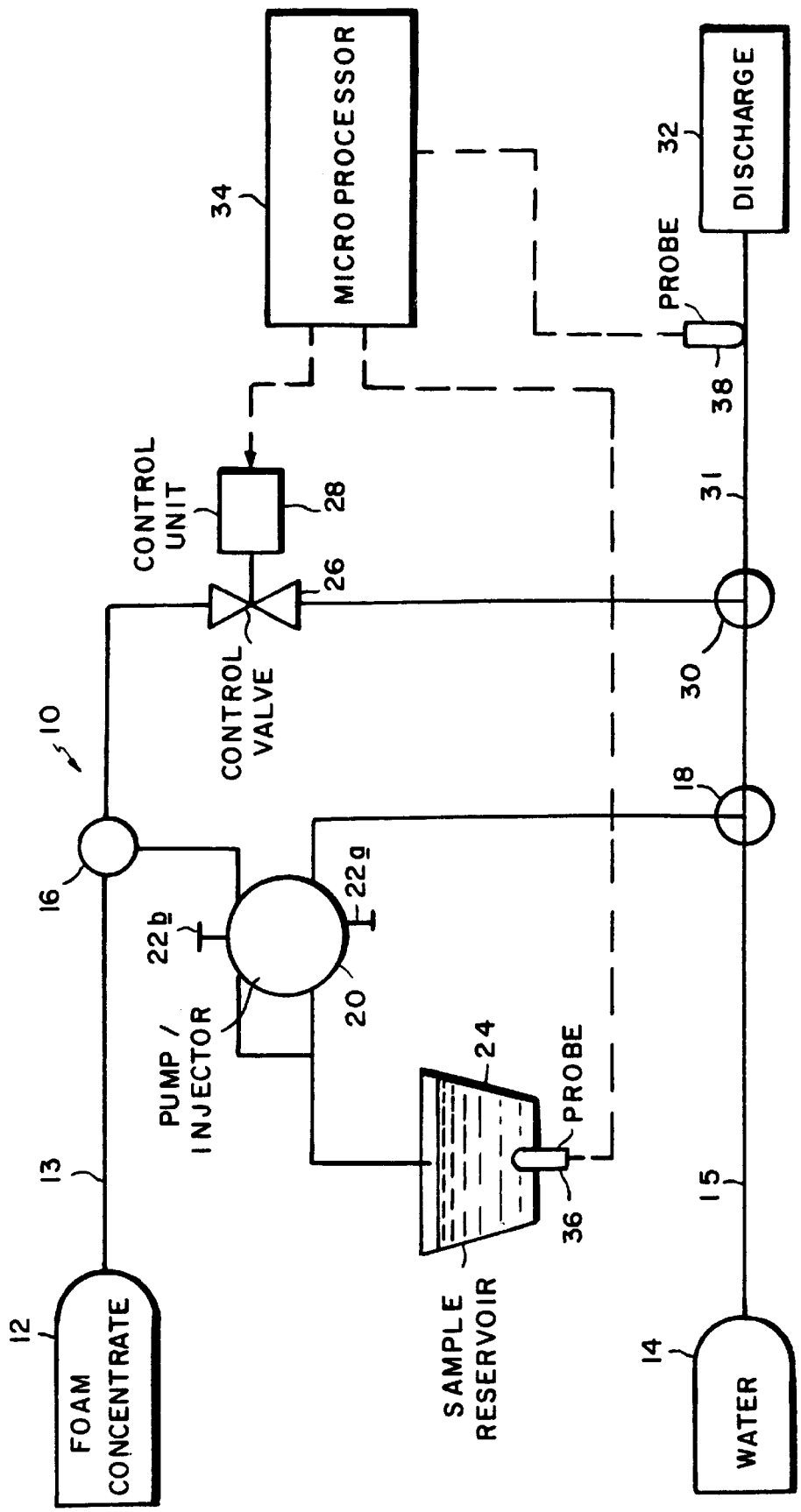
FIG. 1 shows a schematic block diagram of the proportionally constant mixture system in accordance with the present invention.

With reference now to FIG. 1, a proportioning system 10 in accordance with the present invention is shown. The system includes a first supply 12 of a first fluid and a second supply 14 of a second fluid. For purposes of illustration, the first and second fluids may be foam concentrate and water, respectively. The foam concentrate and water are driven by conventional means, e.g., a pump or other sources such as a pressure vessels or reservoirs (not shown), along flow paths 13 and 15, respectively. A control valve 26 is adjustable to provide a predetermined amount of foam concentrate to be injected into the flow of water so as to achieve a desired solution. The valve 26 is automatically adjusted by a valve control unit 28 which receives control signals from a microprocessor 34. The control of valve 26 may be operated electromechanically, electropneumatically, or electrohydraulically. The desired amount of foam concentrate from supply 12 is combined with the flow of water from supply 14 by a flow combining unit 30. The mixed solution of foam concentrate and water is thereafter released from the system by a discharge device 32.

According to the present invention, the manner in which the microprocessor 34 adjusts the control mixing valve 26 depends on measurements of the specific electrochemical properties of the fluids to be mixed, in this example water and foam concentrates. Since both water and foam concentrates are electrolytes, their chemical make-up is such that they have the ability to conduct an electric current, thus the fluids are conductive. It is therefore possible to measure the percentage concentration of foam concentrate in water by measuring the conductivity of the foam solution and comparing it to desired predetermined conductivity values. Thereafter, the mixture ratio is adjusted in accordance with the compared values.

As shown in FIG. 1, T-connections 16 and 18 are provided along the flow paths 13 and 15, respectively, for diverting a partial flow of the fluids to individually adjustable injectors 22a and 22b of a low capacity duplex metering pump 20. The metering pump 20 preferably has a maximum pumping capacity of about two gallons per hour for each injector. The adjustable injectors 22a and 22b are set to desired mixture ratios by an operator, for example 97 parts water and 3 parts foam or 94 parts water and 6 parts foam, etc. The metering pump draws the desired ratios of water and foam concentrate from the flow lines 13 and 15 and mixes them together. The mixed solution of foam concentrate and water is discharged into a sample reservoir 24. A conductivity probe 36 is installed within the sample reservoir 24 for measuring the conductivity of the sample mixtures. The probe 36 thereafter provides a signal to the microprocessor 34 indicative of the conductivity measurement. It will be appreciated that the reservoir 24 may be provided with an overflow valve (not shown) or a discharge path (not shown) to the discharge device 32 so that continuous sampling of the water and foam concentrate may occur.

Conductivity measurement signals from a conductivity probe 38 located in the foam solution discharge line 31 which makes similar conductivity measurements of the solution being discharged at the discharge device 32, are simultaneously sent to the microprocessor 34. The microprocessor operates to compare the conductivity measurements of the sample mixture in the sample reservoir 24 and the mixture of foam concentrate and water which is actually being discharged by the system. In response to the results of this comparison, the microprocessor thereafter generates a control signal to the control unit 28 to make appropriate adjustments of the control mixing valve 26 so that the differences between the compared measurements of the sample solution in the sample reservoir 24 and the solution being discharged at discharge 32 are at least minimized and preferably substantially eliminated. It will be appreciated by those of skill in the art that the microprocessor 34 may be programmed so that the required match of measured conductivity values would be within a range, rather than an exact number, so as to prevent the control mixing valve from continuously "hunting". This range may be adjustable to any degree of accuracy desired. Since the metering pump 20 operates to continuously sample the foam concentrate and water being mixed, the system 10 is capable of making instantaneous adjustments to compensate for changes in the water source or type of foam concentrate being used. This is most advantageous in situations where the supply of foam concentrate may be refilled during operating with a foam concentrate of a different brand or type, thus having differing conductivity characteristics than that of the foam concentrate previously used in the system. The same is true of the water supply in that different water supplies may provide water having different conductivity characteristics.

It will be appreciated by those of skill in the art that modifications of the system 10 as shown in FIG. 1 could be made so that the system has multiple injection points for the foam concentrate to be mixed with the flow of water, and multiple foam solution discharge devices. The system 10 may be modified such that each of the multiple injection points includes a dedicated control mixing valve and discharge conductivity probe. Conventional microprocessor designs and programs would permit the operator to select foam solution at certain discharge points and water at others. Furthermore, the use of multiple sample reservoirs may be utilized so that each of the multiple discharge devices could discharge foam solutions having different mixture ratios. In addition, the microprocessor 34 may be programmed to provide a display of the present mixture ratio so that the operator may manually adjust one or more of the control mixing valves.

Figure 2:
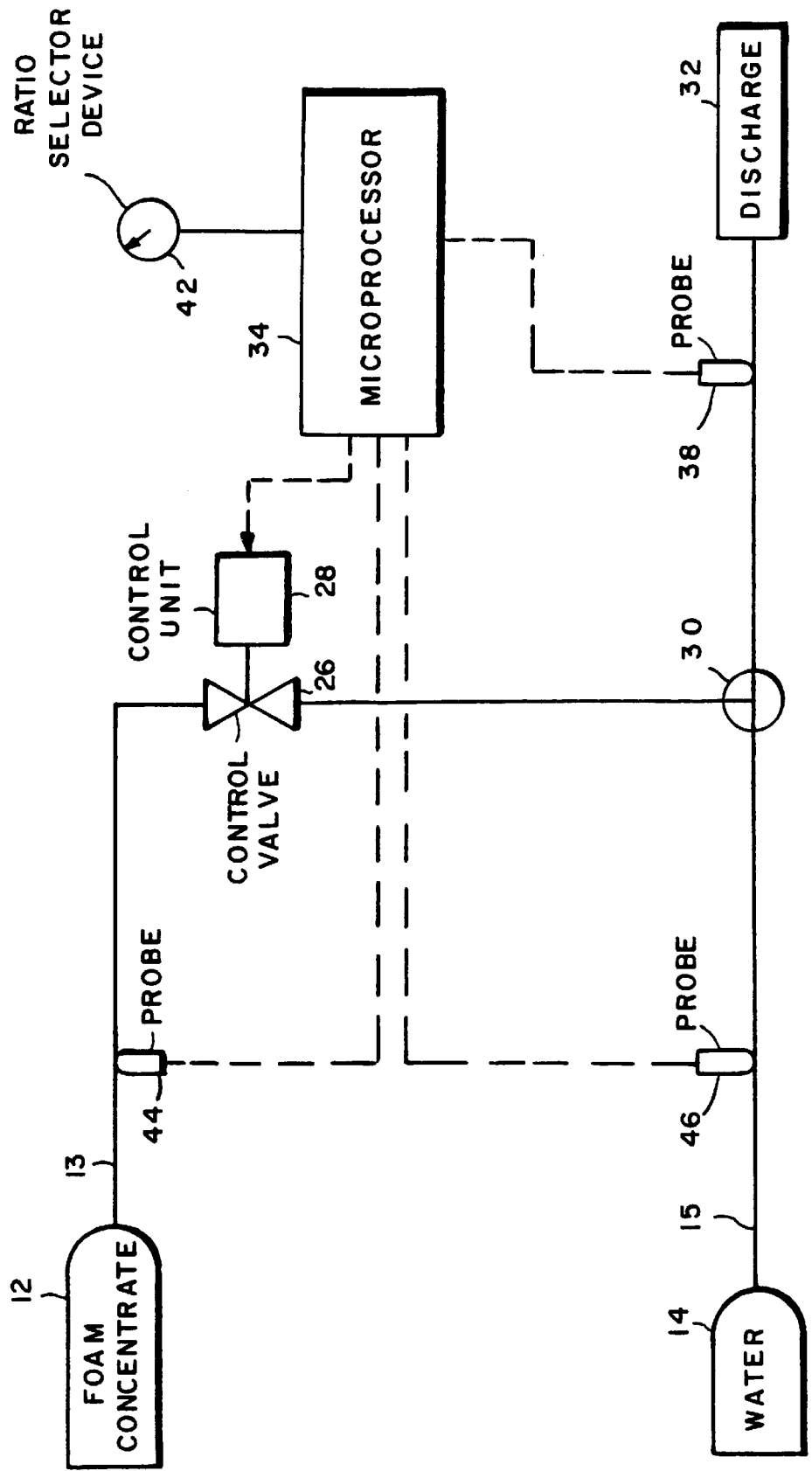
FIG. 2 shows a schematic block diagram of an alternate embodiment of the proportionately constant mixture system of the present invention.

With reference now to FIG. 2, an alternate embodiment of the present invention is shown as a proportionately constant mixing system 40. Similar to the system 10 of FIG. 1, the system 40 includes a first supply 12 of a first fluid and a second supply 14 of a second fluid. For purposes of illustration, the fluids may be foam concentrate and water, respectively. The foam concentrate and water are driven by conventional pumps or other sources such as pressure vessels or reservoirs (not shown) along respective flow paths 13 and 15. A control valve 26 is adjustable to provide a predetermined amount of foam concentrate to be injected into the flow of the water so as to achieve the desired solution along a common flow path. The valve 26 is automatically adjusted by a valve control unit 28, which receives control signals from a microprocessor 34. The control of valve 26 may be operated electromechanically, electrohydraulically or electropneumatically. The desired amount of foam concentrate is combined with the flow of water from supply 14 by a flow combining unit 30. The mixed solution of foam concentrate and water is thereafter released from the system by discharge device 32.

According to the present invention, the manner in which the microprocessor 34 adjusts the control valve 26 depends on measurements of the specific electrochemical properties of the fluids to be mixed, in this example, water and foam concentrates. Since both water and foam concentrates are electrolytes, their chemical make-up is such that they have the ability to conduct an electric current, thus the fluids are conductive.

Figure 3:
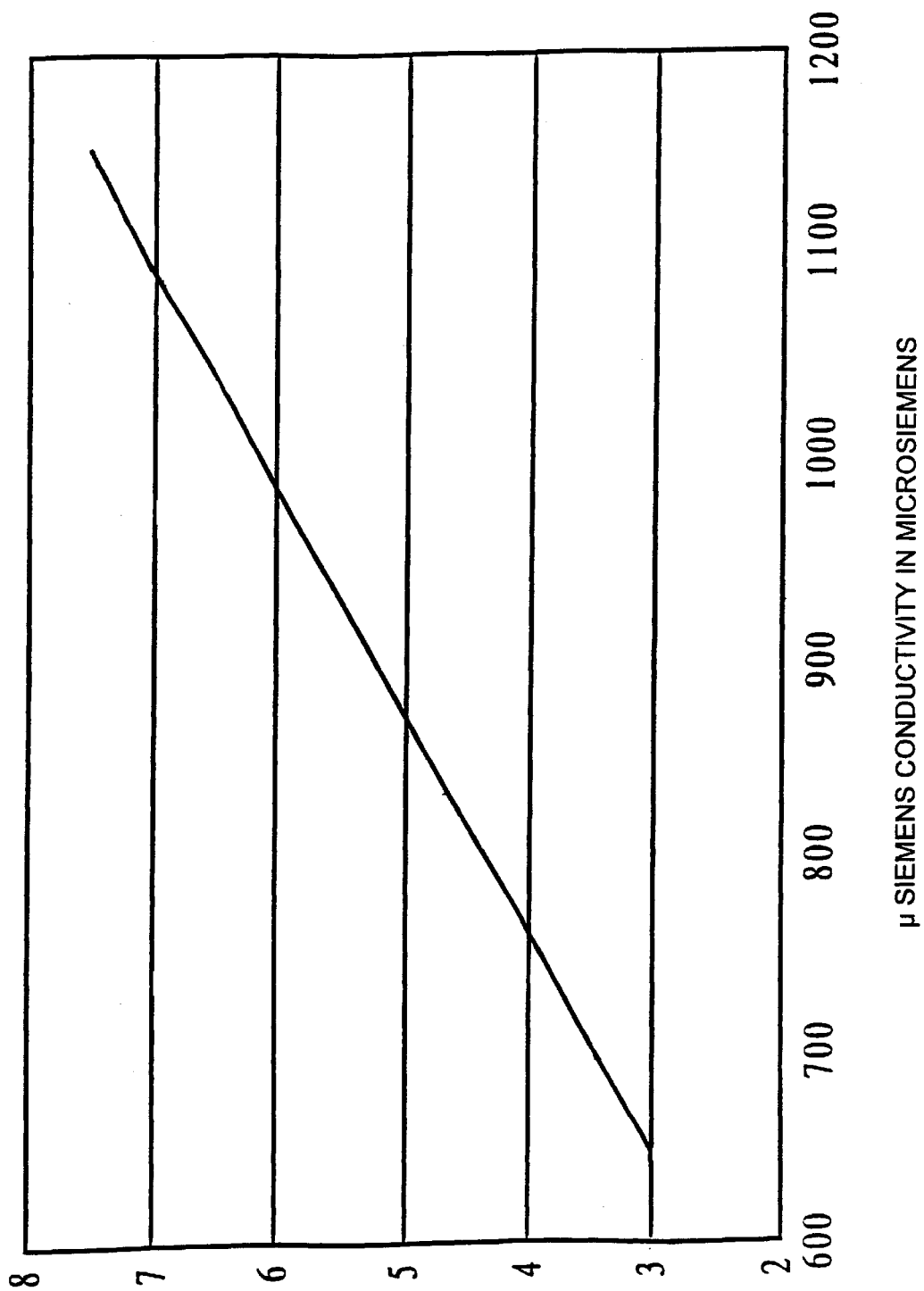
FIG. 3 shows a graph with the relationship between the concentration of a typical foam concentrate solution in water and the conductivity of the solution in the range of 0 to 8% foam concentrate.

The conductivity of foam concentrates is much greater than that of water. Therefore, even a very dilute solution of foam concentrate in water will have a conductivity much greater than that of water. FIG. 3 shows a graph with the relationship between the concentration of a typical foam concentrate solution in water and the conductivity of the solution in the range of 0 to 8% foam concentrate. Foam concentrates are usually designed to be mixed with water at concentrations ranging from 0.3% to 6%. The relationship between concentration and solution conductivity is linear for all known foam concentrates at concentrations in the range of 0% to 8%. The line on the graph in FIG. 3 may be expressed algebraically by an equation of the type: $y = A + kx$, where A and k are constants, x is the concentration of the foam concentrate in the solution, and y is the conductivity of the solution.

A ratio selector device 42 is set for a desired proportioning percentage of foam concentrate and water for storage by the microprocessor 34. A conductivity probe 44 is disposed along the flow line 13 from the foam concentrate supply 12 for measuring the conductivity value of the foam concentrate and providing a signal indicative of same to the microprocessor. Similarly, a conductivity probe 46 is provided along the water flow line 15 for measuring the conductivity value of the water and providing the microprocessor with this value. The microprocessor 34 operates to compare the measured conductivity values of the water and foam concentrate with the desired mix ratio percentage set at the selector device 42. A determination is then made by the microprocessor of the conductivity value required for the system 40 to yield a solution with the correct proportioning ratio based on the setting of ratio controller device 42. The conductivity probe 38 provides the microprocessor with signals indicative of conductivity measurements of the discharged solution. The microprocessor 34 thereafter compares the previously determined conductivity value which is desired with the actual conductivity value being discharged and provides a control signal to the control unit 28 for adjusting the control mixing valve 26 in order to minimize the differences between the compared values, thus providing a solution with the correct proportioning ratio.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A system for maintaining a predetermined proportionate mixture of first and second fluids, said system comprising:

mixing means for mixing said first and second fluids to continuously produce a proportionate discharge mixture;

means for establishing a set point representative of a desired conductivity characteristic of said first and second fluids which corresponds to said predetermined proportionate mixture, said establishing means comprising first measuring means for measuring the conductivity characteristics of each of the fluids flowing along separate paths, and second measuring means for measuring the conductivity characteristics of the predetermined proportionate mixture flowing along a common path;

means for comparing the conductivity of the discharge mixture with the set point, and for generating a control signal representative of any difference therebetween; and means responsive to said control signal for adjusting said mixing means in order to minimize the difference between the measured conductivity of said discharge mixture and said set point.

2. The system of claim 1, wherein said adjusting means comprises an adjustable control valve.

3. The system of claim 1, wherein said measuring and comparing means comprises a microprocessor.

4. The system of claim 1, wherein said first and second fluids comprise water and foam concentrate.

5. A method of maintaining a predetermined proportionate mixture of first and second fluids, said method comprising the steps of:

mixing said first and second fluids to continuously produce a proportionate discharge mixture;

establishing a set point representative of a desired conductivity characteristic of said first and second fluids which corresponds to said predetermined proportionate mixture, said establishing step comprising measuring the conductivity characteristics of each of the fluids flowing along separate paths, and measuring the conductivity characteristics of the predetermined proportionate mixture flowing along a common path;

comparing the conductivity of the discharge mixture with the set point, and for generating a control signal representative of any difference therebetween; and adjusting said mixing in response to said control signal in order to minimize the difference between the measured conductivity of said discharge mixture and said set point.

6. The system of claim 1, wherein said comparing means comprises means for calculating a conductivity value representative of the desired proportionate mixture.

7. The system of claim 1, wherein said establishing means comprises a ratio selector device.

* * * * *